United States Patent
Collura et al.

(10) Patent No.: US 11,817,697 B2
(45) Date of Patent: Nov. 14, 2023

(54) METHOD TO LIMIT THE TIME A SEMICONDUCTOR DEVICE OPERATES ABOVE A MAXIMUM OPERATING VOLTAGE

(71) Applicant: International Business Machines Corporation, Armonk, NY (US)

(72) Inventors: Adam Benjamin Collura, Hopewell Junction, NY (US); Michael Romain, Beacon, NY (US); William V. Huott, Holmes, NY (US); Pawel Owczarczyk, Highland, NY (US); Christian Jacobi, West Park, NY (US); Anthony Saporito, Highland, NY (US); Chung-Lung K. Shum, Wappingers Falls, NY (US); Alper Buyuktosunoglu, White Plains, NY (US); Tobias Webel, Schwaebisch-Gmuend (DE); Michael Joseph Cadigan, Jr., Poughkeepsie, NY (US); Paul Jacob Logsdon, Poughkeepsie, NY (US); Sean Michael Carey, Hyde Park, NY (US); Stefan Payer, Stuttgart (DE); Karl Evan Smock Anderson, Poughkeepsie, NY (US); Mark Cichanowski, Hutto, TX (US)

(73) Assignee: International Business Machines Corporation, Armonk, NY (US)

( * ) Notice: Subject to any disclaimer, the term of this patent is extended or adjusted under 35 U.S.C. 154(b) by 87 days.

(21) Appl. No.: 17/657,989

(22) Filed: Apr. 5, 2022

(65) Prior Publication Data
US 2023/0318286 A1    Oct. 5, 2023

(51) Int. Cl.
  *G06F 1/28*        (2006.01)
  *H02H 9/04*        (2006.01)

(52) U.S. Cl.
  CPC .............. *H02H 9/04* (2013.01); *G06F 1/28* (2013.01)

(58) Field of Classification Search
  CPC ..... G06F 1/32; G06F 9/44; G06F 1/12; G06F 1/28
  See application file for complete search history.

(56) References Cited

U.S. PATENT DOCUMENTS

| 5,748,425 A | 5/1998 | Gutsch et al. |
| 5,835,328 A | 11/1998 | Maloney et al. |

(Continued)

FOREIGN PATENT DOCUMENTS

CN    101599487 A    12/2009

OTHER PUBLICATIONS

PCT, International Search Report and Written Opinion of The International Searching Authority for PCT Application PCT/IB2023/050393 dated Jun. 5, 2023.

(Continued)

*Primary Examiner* — Keshab R Pandey
(74) *Attorney, Agent, or Firm* — Patterson + Sheridan, LLP

(57) ABSTRACT

The method and systems described herein provide for identifying and mitigating undesirable power or voltage fluctuations in regions of a semiconductor device. For example, embodiments include detecting a region, such as an individual processor, of a processor chip is exhibiting a reduced power draw and a resulting localized voltage spike (e.g., a spike that exceeds Vmax) that would accelerate overall device end-of-life (EOL). The described systems respond by activating circuits or current generators located in the given (Continued)

region to draw additional power via a protective current. The protective current lowers the local voltages spikes back to within some pre-specified range (e.g., below a Vmax). The resulting reduction in the time above Vmax in testing reduces the number of devices that will need to be discarded due to Vmax violations as well as increases the expected reliability and lifespan of the device in operation.

25 Claims, 5 Drawing Sheets

(56) References Cited

U.S. PATENT DOCUMENTS

| | | | |
|---|---|---|---|
| 7,706,113 | B1 | 4/2010 | Lien et al. |
| 9,575,529 | B2 | 2/2017 | Curran et al. |
| 9,733,685 | B2 | 8/2017 | Lefurgy et al. |
| 9,874,917 | B2 | 1/2018 | Lefurgy et al. |
| 10,312,820 | B2 | 6/2019 | Fogel |
| 11,197,374 | B2 | 12/2021 | Sturcken et al. |
| 2007/0002512 | A1 | 1/2007 | Schonenberger |
| 2008/0285199 | A1 | 11/2008 | Deutschmann et al. |
| 2011/0235228 | A1 | 9/2011 | Salcedo et al. |
| 2012/0054503 | A1* | 3/2012 | Hsiao .............. G06F 1/324 713/300 |
| 2012/0054515 | A1 | 3/2012 | Naffziger et al. |
| 2016/0254662 | A1 | 9/2016 | Dawley |
| 2019/0068066 | A1 | 2/2019 | Fogel |
| 2019/0146018 | A1* | 5/2019 | Nakamura ............. G01R 27/14 324/713 |
| 2019/0146568 | A1 | 5/2019 | Bose et al. |
| 2019/0182957 | A1 | 6/2019 | Sturcken et al. |

OTHER PUBLICATIONS

Onsemi, "FAN54110—USB-Compatible Single-Cell Li-Ion Charger with DBP," Semiconductor Components Industries, LLC, Year: 2013, pp. 1-25.

Philips Semiconductors, "Power Control with Thyristors and Triacs," Power Semiconductor Applications, Year: 2018, pp. 1-84.

Authors et al., "Method and Apparatus for Power Management in Multi-Core, Multi-Chip Processors Using Automatic Frequency and Supply Voltage Control," ip.com, dated Nov. 24, 2009, pp. 1-7, IP.Com No. IPCOM000190350D.

Authors et al., "Method and System for dynamically modifying Circuit operation to expand Dynamic Power Management Capabilities," IP.Com, Dated: Jun. 2, 2010, pp. 1-3, IP.Com No. IPCOM000196483D.

Authors et al., "Dynamic Error Correction of Voltage Regulators and Voltage Monitor Circuits by Reference Ground Shifting," IP.Com, Dated: Jun. 5, 2015, pp. 1-5, IP.com No. IPCOM000241893D.

* cited by examiner

METHOD TO LIMIT THE TIME A SEMICONDUCTOR DEVICE OPERATES ABOVE A MAXIMUM OPERATING VOLTAGE

BACKGROUND

The present invention relates to limiting the time a semiconductor device operates above a specified maximum voltage (Vmax) in order to prevent increased wear to voltage sensitive components.

Semiconductor devices, such as processor chips, are designed according to design specifications for general or expected usage of the device. This general usage includes a general expected power and voltage level in the chip. The device, operating within the design specifications, has a lifespan target, where the device is expected to operate for the period of time in the lifespan. However, when the device is operated outside of the design specification, the device may experience increased wear that shortens its lifespan target.

In order to maintain desired technology reliability standards, including reliability standard for processor chips, it is necessary to limit the voltage to which various technologies are exposed during operation. For example, a device operating within the design specifications will typically not experience increased wear on voltage sensitive components due to high voltage; however a device operating outside of given design specifications (e.g., Vmax violations) will experience increased wear on the voltage sensitive components. Providing a method and system to limit a time a device is above the Vmax level will result in increased reliability and extended EOLs for devices, since the devices spend less time violating Vmax during operation.

Additionally, the design lifespan targets necessitates the testing of chips during manufacture. For example, a manufacturer will test and filter out any devices that require a voltage exceeding some pre-established technology Vmax. Often times, processor chips and other devices that may otherwise function properly are disposed of due to Vmax violations during testing. For example, in order to achieve a desired part frequency, different parts/processors are set to different voltages. In an example, where a part requires a voltage above Vmax the part is discarded which lowers yield for the device. Providing a method and system to limit a time a device is above the Vmax level will result in increased manufacturing and testing yield since less devices will violate Vmax during testing.

Furthermore, as semiconductor technology has scaled down, Vmax limits for devices has also decreased. For example, the general design Vmax dropped approximately 10% between the 14 nm and 7 nm technology nodes. Moreover, performance per millivolt (mV) has increased (despite reduced voltage range, performance gains are exhibited between 14 nm and 7 nm technology nodes). These developments, as well as future development in smaller scale devices, emphasizes the increased sensitivity to voltage that processor chips and other semiconductors face, as the technology continues to scale smaller.

The above described Vmax and device voltage concerns are also complicated by the variability of power draw across a large variety of circuits under a large variety of conditions. Previous methods typically handle Vmax violations in processor chips by lowering an overall voltage on the processor chip. While this may avoid Vmax violations on the processor chip, it leaves the chip operating a less than an optimal level. Providing a method and system to limit a time a specific processor is above the Vmax level will result better performance of processor chips overall while preventing failure of the device due to repeated Vmax violations.

SUMMARY

According to one embodiment of the present disclosure, a method is provided. The method includes monitoring a voltage state for a processor in a semiconductor device, detecting, at a first time, the processor is in a high voltage state, and determining a protective current for the processor to lower the voltage state of the processor from the high voltage state. The method also includes activating at least one current generator to implement the protective current, detecting, at a second time, the processor is in a second voltage state, and adjusting an activation of the at least one current generator based on the second voltage state. Advantageously, the method limits a time that the processor and semiconductor device operates above a Vmax for the semiconductor, which improves reliability and expected lifespan of the semiconductor device. The method also advantageously improves a yield of the semiconductor device during fabrication due to the limited time above Vmax.

According to another embodiment of the present disclosure, monitoring the voltage state may include: monitoring at least one processor behavior condition on the processor and correlating a first condition of the at least one processor behavior condition to a voltage state. Additionally, determining the processor is in the high voltage state may include: detecting at least one factor in the first condition indicates the processor is in a high voltage state and determining the at least one factor is above a high voltage state threshold. Advantageously, this allows for a high voltage state to be detected for the processor using behavior conditions of the processor.

According to still another embodiment of the present disclosure, monitoring the voltage state may include: monitoring at least one physical condition of the processor and detecting, from the at least one physical condition, a processor voltage measurement. Additionally, determining the processor is in the high voltage state may include: determining the processor voltage measurement is above a high voltage state threshold. Advantageously, this allows for a high voltage state to be detected for the processor using physical conditions or direct measurements of the voltage conditions of the processor.

According to another embodiment of the present disclosure, determining the protective current for the processor may include: determining a voltage level of the processor in the high voltage state and determining the protective current to lower the voltage level below a maximum voltage level for the semiconductor device. Additionally, activating at least one current generator may include: selecting a first number of current generators, where the first number of current generators draw a first current equal to the protective current, and activating the first number of current generators. Advantageously, this allows for an accurate determination of a protective current and selection of the appropriate number of current generators to generate the protective current, without causing too much voltage droop in the processor and semiconductor device.

According to still another embodiment of the present disclosure, activating at least one current generator may include: determining an activation delay for the protective current and activating the at least one current generator according to the activation delay. Advantageously, this provides for a sufficient amount of delay for the processor to avoid activating the protective current when the protective current may cause an overcorrection in the voltage across the processor or too much voltage droop in the processor.

According to another embodiment of the present disclosure, determining the processor is in a second voltage state further may include a feedback process including: monitoring the voltage state for the processor in the high voltage state, and determining, from at least one of processor behavior conditions of the processor and physical conditions of the processor, a processor voltage level at second time is below a threshold for protective current deactivation. Additionally, adjusting the activation of the at least one current generator may include: when the processor voltage level at the second time is above a high voltage state threshold selecting a second number of current generators where the second number of current generators draw a second current, and when the processor voltage level at the second time is below the high voltage state threshold, deactivating the at least one current generator. Advantageously, this provides a feedback mechanism for activating the protective current, where the current state of the current generators and voltage state of the processor is used to determine how to adjust or deactivate the current generators.

According to still another embodiment of the present disclosure, the method may also include: identifying, from at least one of processor behavior conditions of the processor and physical conditions of the processor, predictive conditions for the high voltage state, detecting at a third time, using the predictive conditions, an oncoming high voltage state prior to detecting a second high voltage state, determining a predictive current for the processor, and activating the at least one current generator to implement the predictive current prior to the device entering the second high voltage state. Advantageously, this provides a prediction mechanism for activating a predictive current, where the predictive current allows for the processor to avoid a voltage exceeding a Vmax for the semiconductor device while in the high voltage state.

According to one embodiment of the present disclosure, a system is provided. The system may include one or more computer processors and a memory containing a program which when executed by the computer processors performs an operation. The operation includes monitoring a voltage state for a processor in a semiconductor device, detecting, at a first time, the processor is in a high voltage state, determining a protective current for the processor to lower the voltage state of the processor from the high voltage state, activating at least one current generator to implement the protective current, detecting, at a second time, the processor is in a second voltage state, and adjusting an activation of the at least one current generator based on the second voltage state. Advantageously, the system and operation limits a time that the processor and semiconductor device operates above a Vmax for the semiconductor, which improves reliability and expected lifespan of the semiconductor device. The system and operation also advantageously improves yield of the semiconductor device during fabrication due to the limited time above Vmax.

According to one embodiment of the present disclosure, a controller is provided. The controller includes condition circuitry configured to: monitor a voltage state for a processor in a semiconductor device, detect, at a first time, the processor is in a high voltage state, and detect, at a second time, the processor is in a second voltage state. The controller also includes control circuitry configured to: determine a protective current for the processor to lower the voltage state of the processor from the high voltage state, activate at least one current generator to implement the protective current, and adjust an activation of the at least one current generator based on the second voltage state. Advantageously, the controller limits a time that the processor and semiconductor device operates above a Vmax for the semiconductor, which improves reliability and expected lifespan of the semiconductor device. The controller also advantageously improves yield of the semiconductor device during fabrication due to the limited time above Vmax.

According to one embodiment of the present disclosure, a computer-readable storage medium is provided. The computer-readable storage medium may include computer program code that when executed by operation of one or more computer processors, performs an operation. The operation includes monitoring a voltage state for a processor in a semiconductor device, detecting, at a first time, the processor is in a high voltage state, determining a protective current for the processor to lower the voltage state of the processor from the high voltage state; activating at least one current generator to implement the protective current, detecting, at a second time, the processor is in a second voltage state, and adjusting an activation of the at least one current generator based on the second voltage state. Advantageously, the computer-readable storage medium and operation limits a time that the processor and semiconductor device operates above a Vmax for the semiconductor, which improves reliability and expected lifespan of the semiconductor device. The computer-readable storage medium and operation also advantageously improves a yield of the semiconductor device during fabrication due to the limited time above Vmax.

DETAILED DESCRIPTION

Figure 1:
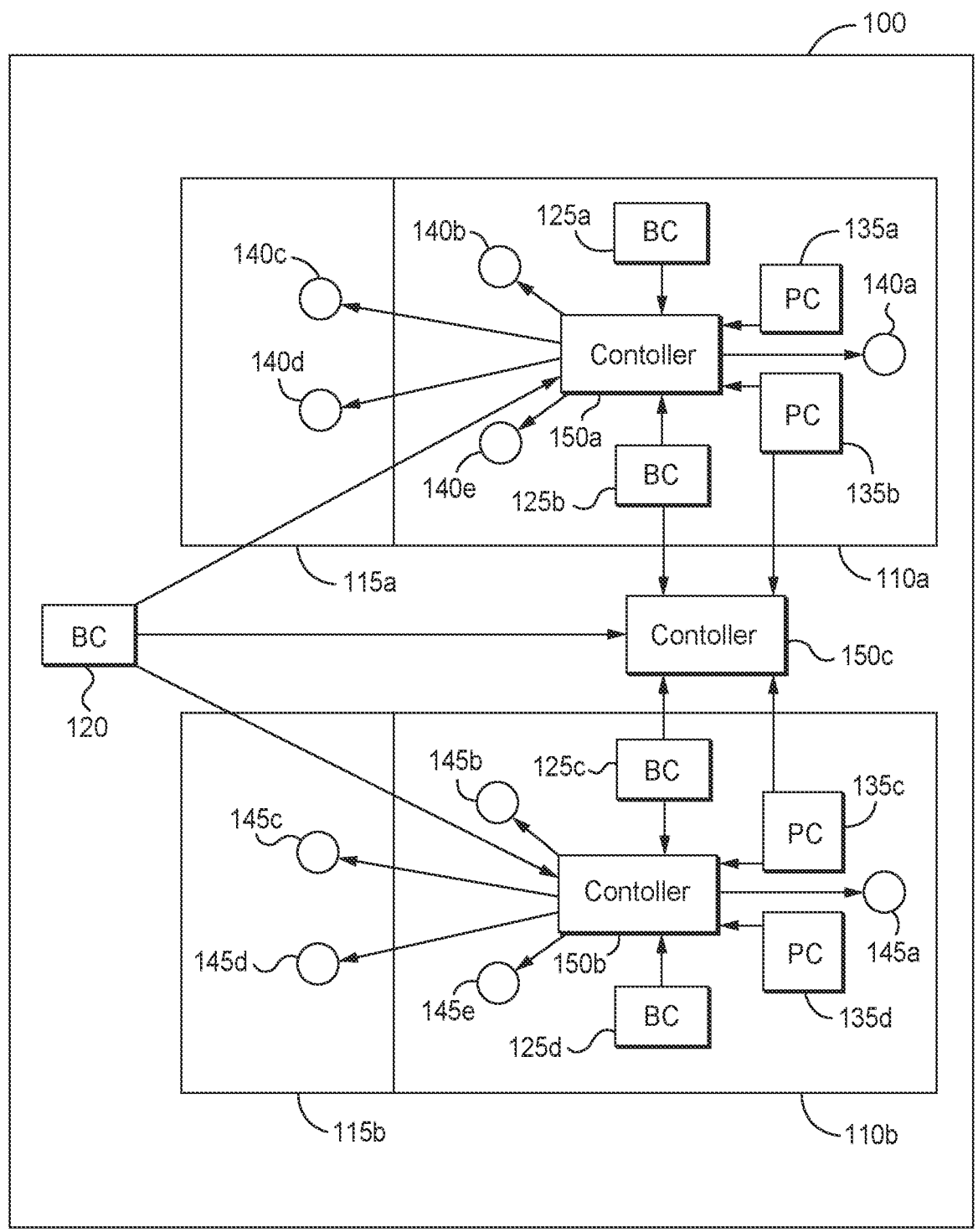
FIG. 1 illustrates a semiconductor device, according to one embodiment.

As described above, semiconductor devices, including processor chips, are designed according to design specifications for general or expected use of the device. This general use includes a general expected power and voltage level in the chip. For example, a device has an expected voltage level during use, as well as a specified Vmax. The Vmax is established for various devices to prevent a premature end of life (EOL) for the associated technology.

While damage may be caused by the Vmax violations (i.e. where a device operates with a voltage above the Vmax for a given period of time) a device operating at or above the Vmax does not necessarily fail immediately. For example, if a device is designed for a given Vmax of "X," the device will still function if exposed to a voltage greater than X; however, as described above the device's design lifespan of "Y" years may shorten. For example, continued or repeated device exposure to a voltage above X will reduce the lifespan to something less than the designed or expected Y years.

As also noted above, a device under testing that frequently exceeds a given Vmax will ultimately reach EOL before the lifespan target. Putting this chip into operation will likely lead to a decrease in reliability and an EOL before the expected lifespan. In this way, the Vmax of a device also acts as a key design and testing constraint that determines which parts of a chip achieve frequency targets within a permissible voltage range during testing.

Moreover, variations in voltage levels across devices further complicates given solutions. For example, a common workload or process executing on a processor chip can draw variable degrees of power across the different circuits on the processor chip. This variability is further amplified by the panoply of different workloads that feature varying power profiles relative to a processor chip's circuits in various regions. Moreover, these regions of a processor chip or semiconductor device may vary in response to a given workload and its associated power profile. For example, regions of a processor chip that exhibit low power and low activity are often most susceptible to Vmax violations and subsequent component deterioration. For example, these regions experience a minimal power draw which corresponds to a high voltage in the region, due to a relatively low IR drop across the associated circuitry.

Due to this variability in power draw across a processor chip and therefore the variability in the voltage observed at the circuits of the processor chip, it is not adequate to simply determine a minimal voltage at which the device is functional (Vmin) that falls beneath Vmax. Instead it is advantageous to limit the applied voltage such that even when the processor enters a state of minimal activity and the voltage applied to the technology rises, the applied voltage remains below the pre-established Vmax.

The embodiments described herein include systems and methods for identifying and mitigating undesirable power or voltage fluctuations in regions of a semiconductor device. For example, embodiments include detecting a region, such as an individual processor, of a processor chip that is exhibiting a reduced power draw and a resulting localized voltage spike (e.g., a spike that exceeds Vmax) that would accelerate overall device end-of-life (EOL). The described systems respond by activating circuits or current generators located in the given region to draw additional power, and thereby bringing those local voltages spikes back to within some pre-specified range (e.g., below a Vmax).

Additionally, the reduction in the time above Vmax in testing reduces the number of devices that will need to be discarded due to Vmax violations. This increases the overall chip yield of a device as well as increases the expected reliability of the device in operation as described above. The embodiments herein also provide advantageous controlling of varying voltage levels across processors with fidelity and precision, thereby mitigating the extent to which all regions of a device are limited so that a few regions don't exceed technology specifications.

FIG. 1 illustrates a semiconductor device 100, according to one embodiment. The device 100 includes processors 110a and 110b. In some examples, the processors 110a and 110b are processing cores in a chip (i.e., the device 100). The processors 110a and 110b may also include associated regions 115a and 115b which may be a memory (e.g., a L3 cache) or other components associated with the processors 110a and 110b respectively. While depicted with two processors or devices in FIG. 1, the device 100 may include more than two processors (e.g., more than two processor cores, etc.). As discussed above, the device 100 has a specified Vmax where the device 100 is designed to operate below the Vmax. In some examples, the device 100 or one or more of the processors 110a and 110b may exceed the specified Vmax for a period of time due to variations in the operations of the device 100 and the processors 110a and 110b.

For example, various workloads executed by the device 100 may fluctuate a current draw across the device 100 and affect the measured voltage of the device. For example, the processor 110a may execute processing functions at a first high power level which draws a first current. Within a consistent circuit region like the processor 110a, when a power (e.g., power draw) increases the current across the processor also increases. Accordingly, the increase of current within a consistent circuit region results in a greater voltage drop across the chip's power grid prior to reaching the logic gates. This increased voltage drop means that a lower voltage is provided at the transistor level. Alternatively, when a power draw for the processor 110a decreases, the current across the processor also decreases. Accordingly, the decrease in current within the consistent circuit region results in a voltage spike across the power grid of the processor 110a prior to reaching the associated logic gates. In turn, a higher voltage is provided at the transistor level. When these higher voltages are above the Vmax for the device 100, the logic gates, transistors, and other voltage sensitive components experience increased wear and ultimately an early EOL before a designed lifespan.

In order to detect and respond to high voltage conditions in a high voltage state for the device, the device 100 includes one or more controllers. For example, the device 100 includes a central controller 150c as well as region controllers 150a and 150b (herein referred to collectively as controller 150). The controller 150 may interact and implement voltage state monitoring and protection across the device 100. In some examples, the device 100 includes only one central controller 150c which implements voltage state monitoring and protection for the entire device 100 including region specific controls the processors 110a and 110b without region specific controllers. In some examples, the device 100 includes only region specific controllers, such as the region controllers 150a and 150b, which implement voltage state monitoring and protection for the respective regions without a central controller.

Figure 5:
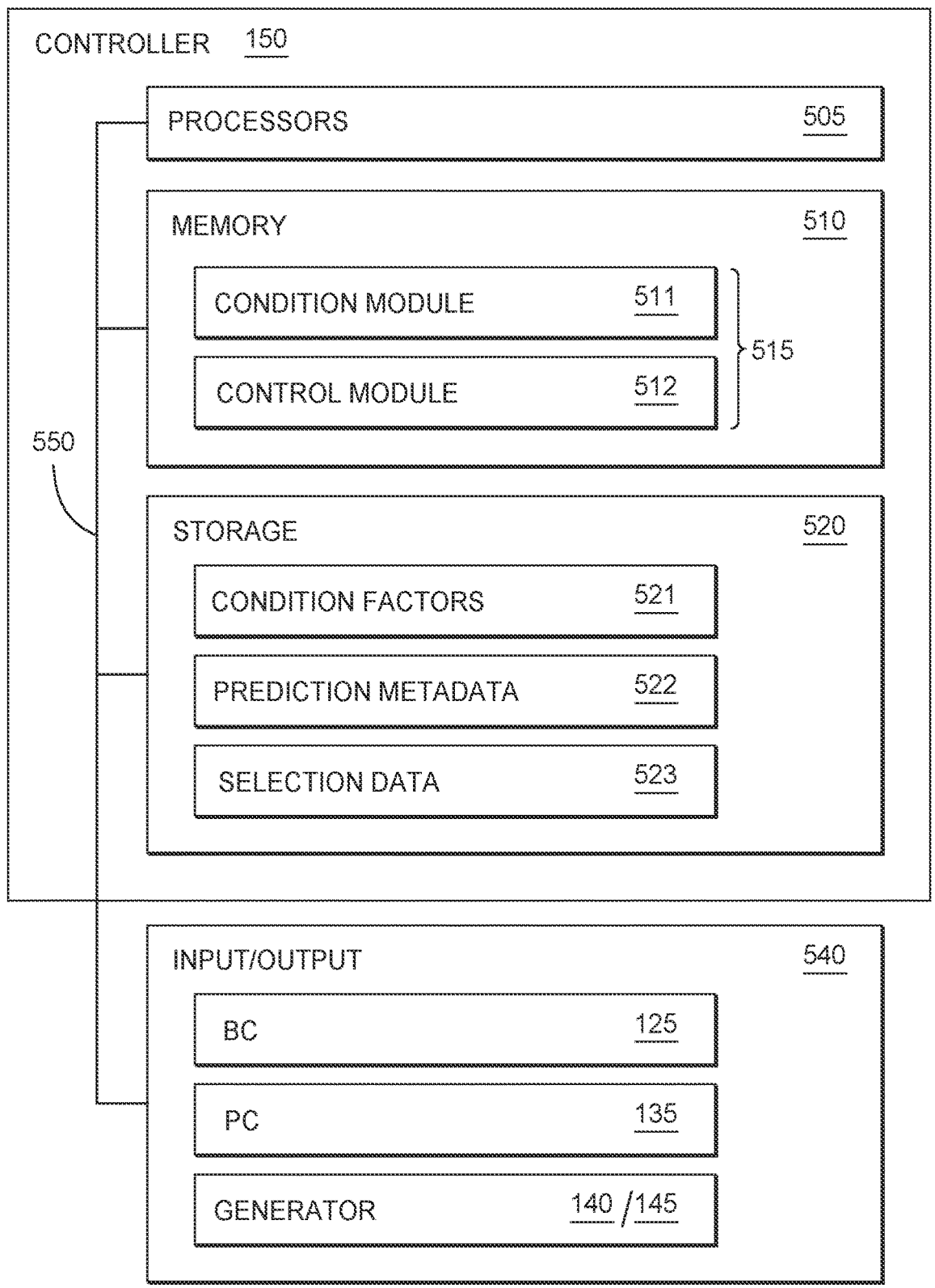
FIG. 5 illustrates a block diagram of a system, according to an embodiment.

In some examples, the controller 150 may be implemented as on-chip microcontrollers with respective processors, memory, and program code which when executed by the processors implements voltage state monitoring and protection as described herein and depicted in arrangement 500 of FIG. 5. In some examples, the controller 150 is implemented as on-chip logic circuits which also implement voltage state monitoring and protection as described herein and shown in FIG. 2. The controller 150 may also take the form of a combination of on-chip microcontrollers and on-chip logic circuits.

Figure 2:
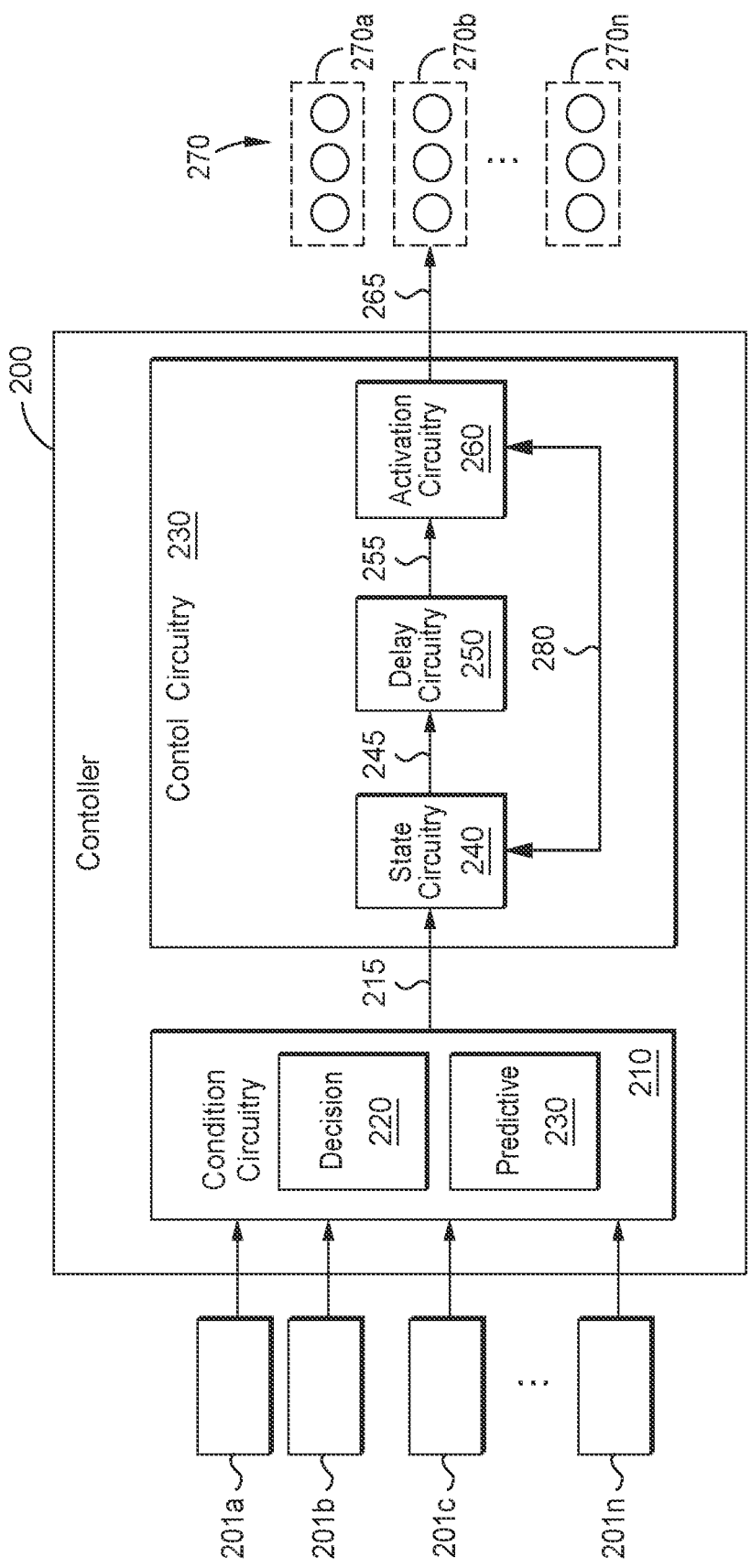
FIG. 2 illustrates a controller, according to one embodiment.
Figure 3:
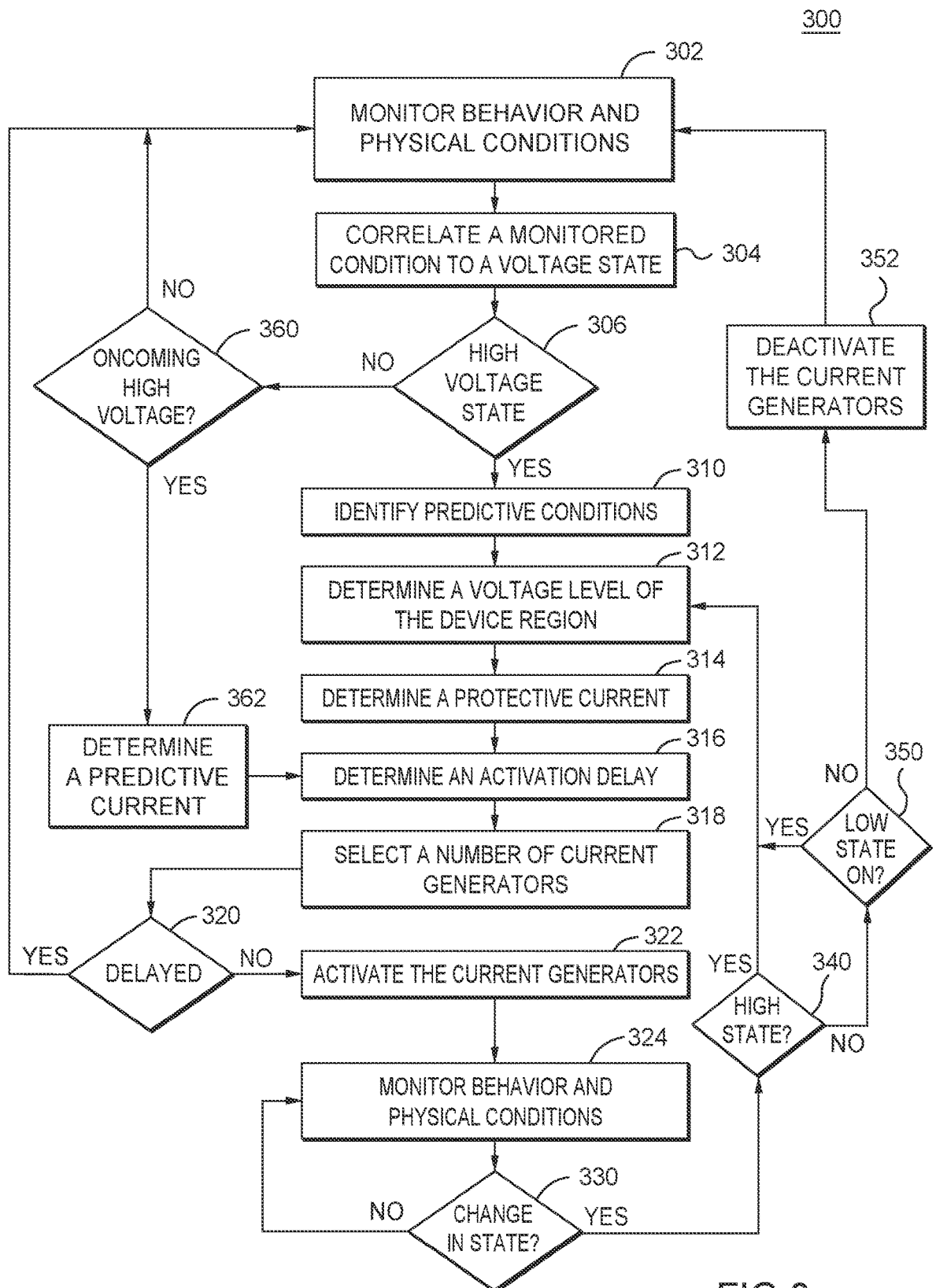
FIG. 3 illustrates a flowchart of a method for a protective current in a semiconductor device, according to embodiments.

The controller 150 receives condition information via a sensing/monitoring mechanism in the controller as described in more detail in relation to FIGS. 2 and 3. The condition information is received from both behavior related sources and physical attribute sources. For example, behavior related sources may include information related to the current function or operations of the processors 110a and 110b.

For example, the processor cores making up the processors 110a and 110b have associated processor behavior information. The behavior information for the processor 110a is provided to or received by the controller 150a (and the central controller 150c) via behavior conditions (BC)

125a and 125b. BCs 125c and 125d are provided to or received by the region controller 150b (and central controller 150c) for the region 110b. For ease of illustration, the BCs are depicted as BCs 125a-125d in FIG. 1, but may include many BCs received each the respective controller from a variety of behavior condition sources for the device 100. The behavior information includes information about what processes the respective processor cores/regions are executing and a manner in which the processes are being executed.

For example, the processor 110a may execute a processing workload with a block instruction fetch. In some examples, the workload executing with a block instruction fetch executes less processes per cycle than typical for the workload. The processor 110a may also operate in a slow mode, where one instruction is executed at a time in an instruction pipeline of the core. These behaviors and the associated BCs may indicate the processor 110a is a low power state, which may also indicate a high voltage in the processor 110a. The BCs 125a-125d may also indicate the respective cores or the processors 110a-110b are operating in a single thread vs multi-thread mode (which may indicate a low power state when in a single thread), are operating with a number of executions issues per cycle (which may indicate low or high power based on the number of executions), indicate whether cache data is being accessed/return to the core of the processors 110a-b, and include information from a long term activity proxy (LTAP) which detects part of the processor core which have not been used in for period of time.

In each of the above BC examples, the information and the responding handling of the information by the controller 150 is configurable/changeable and may be updated by a user or by a learning process for the controller 150. For example, the controller 150 may be updated to recognize various BCs (including factors in the BCs) or combinations of BCs as high voltage state for a region.

In some examples, the BCs 125a-125d may independently indicate to the controller 150 that the processors 110a-b are in a low power—high voltage state and require remediation or a protective current to prevent damage or increased wear. In some examples, the controller 150 use each of the behavior conditions and associated factors in the behavior conditions to determine the voltage state for the respective region. For example, the controller 150a may receive BCs including the BCs 125a-125b and combine the various factors in the behavior conditions in order to determine the voltage state of the processor 110a.

In addition to the behavior conditions, the controller 150 also receives physical conditions (PCs) 135a-135d. The physical conditions represent physical attributes that may be measured or detected for the device 100. For example, the PCs 135a-135d may include information/activity received from a digital droop sensor (DDS) which directly measures/senses voltage droop on the processors 110a-110b. Additional physical conditions may include critical path monitor (CPM) information and measures provided from voltage measurement analog circuits placed in the processors 110a-b. In some examples, the PCs 135a-135d may independently indicate that the processors 110a-b are in a low power—high voltage state and require remediation or a protective current to prevent damage or increased wear.

In some examples, the controller 150 uses each of the physical conditions to determine the voltage state for the respective region. For example, the controller 150a may receive PCs, including the PCs 135a-135b, and combine the various attributes from the PCs in order to determine the voltage state of the processor 110a. The controller 150 may also use the variety of BCs 125a-125d and PCs 135a-135b to sense/determine when the respective processors 110a-110b are in high voltage state and what protective current to implement.

For example, a combination of BCs 125a-125b and PCs 135a-135b may indicate that the processor 110a is in a high voltage state and requires a protective current. In another example, a subset of the 125a-125b and PCs 135a-135b may indicate that the processor 110a is in high voltage state, but the controller 150a (or the central controller 150c) determines from the overall BC and PCs received that the processor 110a is either not in a high voltage state and/or does not require a protective current at given time. Additional details of the logic and methods of the controller 150 is discussed herein in relation to FIGS. 2-4.

In addition to the sensing and monitoring functions of the controllers discussed above, the controller 150 also includes actuation and implementation mechanisms to cause the voltage in the device 100 to not exceed the Vmax for the device 100. In some examples, the controller 150 may consume power/generate current by causing a dummy loop workload on an inactive core area in the respective core. The controller 150 may also cause logic based disablement of clock gating for a respective core in order to raise a power requirement and lower the voltage across the respective region.

Additionally, the controller 150 activates current generators to increase a current and power in a region of the device 100 and lower the voltage in the processor 110a of device 100 below the Vmax. In some examples, current generators include generators 140a-140e associated with the processor 110a and generators 145a-145e associated with the processor 110a. The generators 140a-140e and 145a-145e may be any type of device or circuit which draws or generates a current demand in the respective regions. For example, the generators 140a-140e and 145a-145e may be load line adjustment circuit (LLAC) ring oscillators which are tuned to draw a certain amount of current at a fixed frequency. For example, each of the generators 140a-140e and 145a-145e may include attributes that when activated by the controller 150 cause it to draw a given current. The controller 150 may select all of the generators available to the respective controller, a subset of the generators based on the attributes of the individual generators, or a given group of generators in order to draw a protective current as determined by the controller 150 and described in more detail in relation to FIGS. 2-4 herein.

FIG. 2 illustrates a controller 200, according to one embodiment. In some examples, the controller 150 may be embodied as the controller 200. The controller 200 includes on-chip logic circuits which input conditions and outputs a control signal. For example, the controller 200 includes a sensing mechanism in the condition circuitry 210. The condition circuitry 210 receives conditions 201a-201n from behavior condition sources and from physical condition sources. For example, the controller 200 receives the BCs 125a-d and the PCs 135a-c from various sources as described in relation to FIG. 1.

In some examples, the condition circuitry 210 includes a plurality of switches that switch between high/low states based on a corresponding condition. For example, the BC 125a may indicate that the processor 110a in device 100 is in a slow mode. The corresponding switch in the condition circuitry 210 switches to a high state based on the slow mode of the processor 110a. Another physical or behavior condition may switch to a low mode, when the condition indicates the processor 110a is not in a high voltage state (according to that condition). The decision circuitry 220 combines the outputs from the switches related to the conditions 201a-201n and provides a voltage state signal 215 to the control circuitry 230.

In some examples, the condition circuitry 210 monitors a voltage state for a processor, such as the processors 110a and 110b in FIG. 1, and provides the voltage state signal 215 to the control circuitry 230. When the condition circuitry detects that the processor is in a high voltage state, the voltage state signal 215 is a high voltage state signal. In some examples, the condition circuitry 210 also determines when to activate/generate a protective current. For example, the condition circuitry 210 may determine from the conditions 201a-201n that the processor 110a is in a high voltage state and based on the various conditions and decision circuitry 220 determines when a protective current is to be generated. In some examples, the decision circuitry 220 is configurable to provide for varying thresholds for when a high voltage state is detected and when a protective current is activated.

In some examples, the decision circuitry 220 determines that the processor 110a is in a low voltage state. For example, the condition circuitry 210 determines when a protective current is activated in the low voltage state. The predictive circuitry may also include circuitry that tracks high voltage conditions in the processor 110a, including conditions and condition combination that indicate the processor in a high voltage state. In some examples, the predictive circuitry 225 determines that conditions exist in the low voltage state that necessitate a protective or predictive current and the condition circuitry 210 sends the voltage state signal 215 with an indication of a low power state, with a protective current to be activated.

As discussed above, the voltage state signal 215 may include several combinations information including whether a given region associated with the controller 200 is in a high or low voltage stage and whether to implement a protective current. The control circuitry 230 receives the voltage state signal 215 at the state circuitry 240 which determines a protective current for the processor to lower the voltage state of the processor from the high voltage state. The state circuitry also uses a feedback input 280 to determine a current state for the controlled processor and whether to activate or deactivate current generators. The state circuitry provides a state signal 245 to delay circuitry in the control circuitry 230. The control circuitry 230 also includes the delay circuitry 250 which determines a delay for the activation of the protective current and provides a delay signal 255 to activation circuitry 260. The control circuitry 230 also includes the activation circuitry 260 which activates at least one current generator to implement the protective current. For example, the activation circuitry 260 provides an activation signal 265 to current generators 270. The current generators 270 may include individual current generators and groups 270a-270n of current generators (such as those described in relation to FIG. 1), where the activation signal 265 activates a subset or all of the groups 270a-270n. Additional functions of the controller 200 are described in relation to FIG. 3.

Figure 4:
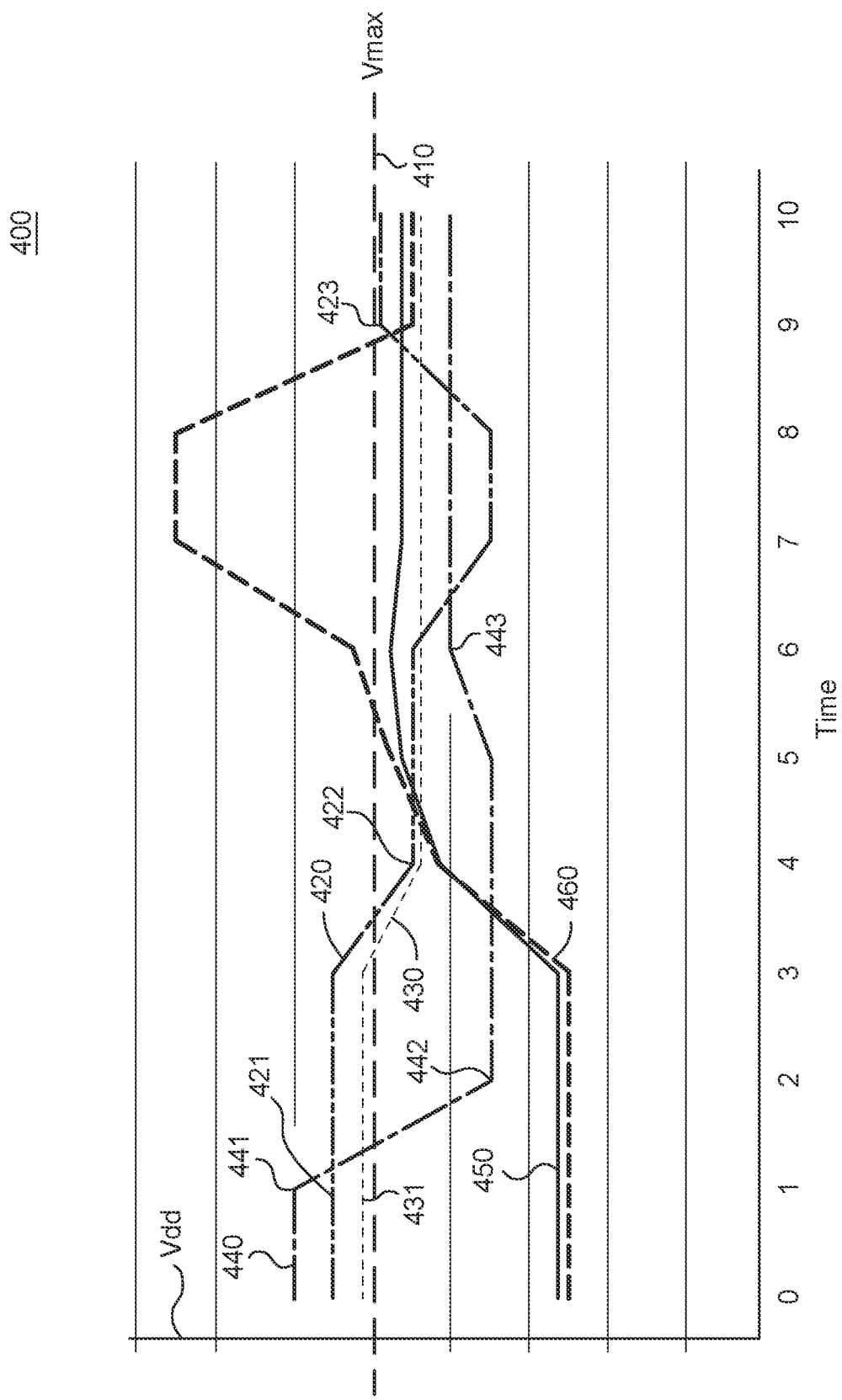
FIG. 4 illustrates a graph of semiconductor device voltages, according to embodiments.

FIG. 3 illustrates a flowchart of a method 300 for a protective current in a semiconductor device, according to embodiments. The method 300 is performed by a controller 150 as described in relation to FIG. 1. In some examples below, reference will be made to FIGS. 1, 2, and 5 in the discussion of method 300. The controller 150 may be an on-chip microprocessor, such as the arrangement 500 described in FIG. 5 or implemented as control circuitry described in relation to FIG. 2. In both implementations, the controller 150 performs the functions of method 300. Additionally, to illustrate a voltage response to the protective current in the semiconductor device, reference will be made to FIG. 4 in the discussion of FIG. 3. FIG. 4 illustrates a graph 400 of semiconductor device voltage scenarios, according to embodiments.

Method 300 begins at block 302 and 304 where the controller 150 monitors a voltage state for a processor. In one example, the controller 150 utilizes the condition circuitry 210 to perform the sensing/monitoring functions of the blocks 302-304. In another example, the controller utilizes a condition module 511 in FIG. 5 to execute the sensing/monitoring functions.

The processor may include a specific region of an overall device. For example, on the device 100 in FIG. 1, controller 150 (as region controller 150a or the central controller 150c) monitors a voltage state for the processor 110a. For the examples, discussed herein, processor refers to an example processor such as the processor 110a in FIG. 1 In some examples, the controller 150 monitors at least one processor behavior condition on the processor and monitors at least one physical condition of the processor at block 302. For example, the controller 150 receives various behavior and physical conditions for the processor 110a including BCs 125a-b and PCs 135a-b.

At block 304 the controller 200 correlates a first condition of the at least one processor behavior condition and the power condition to a voltage state. For example, for the behavior conditions, the controller 150 determines various condition information correlates a given condition to a voltage state. For example, processor behaviors that are associated with low power usage are correlated to a high voltage state and processor behaviors that are associated with a high power usage are correlated to a low voltage state. In some examples, the controller 150 also detects, from the physical condition, a processor voltage measurement. For example, the controller 150 receives DDS or CPM information with information indicating observed physical conditions of the processor 110a. In some examples, the physical information includes a direct measurement of the voltage of the processor 110a. The physical condition information may also include information that is related to a voltage information which is used by the controller 150 along with the behavior conditions to correlate or identify the voltage state of the region.

At block 306 the controller 150 determines when the device is in a high voltage state. For example, for voltage scenarios 430, 420, and 440, at time 0 in graph 400, the voltages are above the Vmax 410. In some examples, the controller 150 uses physical conditions and behavior conditions to determine that the processors associated with the voltage scenarios 420, 430, and 440 are in a high voltage stage. In another example, the controller 150 uses physical conditions and behavior conditions to determine that the processors associated with the voltage scenarios 450 and 460 are in a low voltage stage In some examples, the controller 150 determines from physical conditions that the processor voltage measurement is above a high voltage state threshold. For example, a voltage measurement circuit or other type of measurement received at the controller 150 may indicate that the voltage across the processor is above the Vmax 410. In some examples, the controller detects at least one factor in the first condition which indicates the processor is in a high voltage stage and determines the factors are above a high voltage state threshold. For example, the controller 150 determines from the behavior conditions that the processor behavior indicates the device is in a low power state indicating a high voltage state in the processor above the Vmax 410.

When the processor is in a low voltage state such as voltage scenarios 450 and 460, the method 300 proceeds to block 320 as discussed in more detail herein. When the processor is in a high voltage state, the method 300 proceeds to block 310 where the controller 150 identifies, from at least one of processor behavior conditions of the processor and physical conditions of the processor determined in block 304, predictive conditions for the high voltage state. For example, the controller 150 may identify behaviors and factors from the behavior conditions that indicate the device is in the high voltage state, as well as measurements from the physical conditions indicating the processor is in the high voltage state. In some examples, the controller 150 stores the identified behavior conditions and physical conditions for future reference use in predicting an oncoming high voltage state as discussed herein in relation to block 320.

In blocks 310-316, the controller determines a protective current for the processor to lower the voltage state of the processor from the high voltage state. For example, at block 312, the controller 150 determines a voltage level of the processor in the high voltage state. In some examples, the controller 150 uses the physical conditions and the behavior conditions to measure or estimate a voltage at a first time across the processor. For example, the controller 150 determines or estimates that the voltage scenario 440 has a first voltage 441 at time 1 in graph 400. The controller 150 also determines or estimates the voltage scenarios 420 and 430 also have respective first voltages 421 and 431.

At block 314, the controller 150 determines a protective current to lower the voltage level below a maximum voltage level for the processor. For example, the controller 150 using the first voltage 441 determines a protective current which, when generated, would counteract or lower the voltage of the processor in the voltage scenario 440 below the Vmax. The controller 150 also determines respective protective currents for the voltage scenarios 420 and 440.

At block 316, the controller 150 determines an activation delay for the protective current. The activation delay provides several benefits for the controller 150 and the associated processor. In some examples, the activation delay prevents sudden voltage changes and too much voltage droop in the processor. For example, the controller 150 may determine, based on the physical and behavior conditions, that the processor is transitioning, out the high voltage state without the protective current. For example, voltage scenario 430 at time 1 may include conditions that indicate the processor will leave the high voltage state within a given period of time. The controller 150 may determine to delay implementing a protective current in order to not cause too much voltage droop or large voltage swings in the processor.

At block 318, the controller selects a first number of current generators, where the first number of current generators draw a first current equal to the protective current. For example, the controller 150 selects one or more of the generators 140a-140e for the processor 110a that will bring the voltage across the processor below the Vmax. In some examples, the controller 150 selects individual current generators, subsets of current generators, or groups of current generators which together will draw the protective current.

At block 320, the controller determines whether the controller is under an activation delay. When the controller is under the activation delay, the method 300 proceeds to block 302 to monitor processor behavior and physical conditions. For example, for the voltage scenarios 420 and 430 with an activation delay for the times 1-4 the controller proceeds from block 320 to block 302. At time 4, for voltage scenario 430, the controller 150 determines at block 306 that the processor is in a low voltage state without a protective current. For the voltage scenario 420 at time, the controller 150 at block 320 determines the processor is no longer under an activation delay and proceeds to block 322. For the voltage scenario 440 at time 1, there is no activation delay and the method proceed directly to block 322.

At block 322, the controller activates at least one of the current generators according to the activation delay. For example, for the voltage scenario 440 at time 1, the controller activates all of the current generators 140a-140e to bring the voltage across the device to voltage 422 at time 2. For the voltage scenario 420 at time 4, the controller 150 activates only a subset or a group of the current generators such as current generators 140d-140e to lower the voltage across the processor to voltage 422 at time 4.

At block 324, the controller 150 monitors the voltage state for the processor in the high voltage state. For example, the controller monitors the processor in a similar manner to block 302 while the protective current is activated for the processor.

At block 330, the controller 150 detects whether a change has occurred in the voltage state for the processor. In an example, where the processor voltage state has not changed, the method 300 proceeds back to block 324 for further monitoring. In some examples, the behavior conditions or physical conditions indicate the processor is changing or will change behaviors, such as entering a high power state. Method 300 then proceeds to block 340.

At block 340, the controller 150 implements a feedback process by determining, from at least one of processor behavior conditions of the processor and physical conditions of the processor, a processor voltage level at second time. When the voltage state indicates that the processor is no longer in a high voltage state or is below a threshold for protective current deactivation, the method 300 proceeds to block 350.

At block 340, in an example where the processor voltage level region remains in a high voltage state, method 300 proceeds back to block 312 to determine and activate a new protective current. For example, for the voltage scenario 440, the processor may enter into a new voltage state that is still a high voltage state when the processor begins a workload that changes the power consumption of the processor (but does not lower the voltage across the processor below the Vmax). In this case, at time 5 for the voltage scenario 440, the controller 150 detects the new high voltage state, and determines a new protective current for the voltage level of the new high voltage state. The controller also selects current generators that will draw a second protective current less than the first protective current drawn from times 2-5 and activates the current generators such that the processor has a voltage 443 at time 6.

In some examples, at block 340 the controller 150 determines from the behavior and physical conditions the processor has exited the high voltage state and method 300 proceeds to block 350. At block 350, the controller 150 determines from the behavior and physical conditions whether a low state protective current is needed. For example, at time 6, the processor in voltage scenario 442 may exit a high voltage state, but the conditions may indicate that the voltage of the processor is near a Vmax, the device may enter a high voltage state again within a period of time, etc. In this case, the method 300 proceeds back to block 312 to determine a voltage level and a protective current. The protective current in this example is a current that will keep the voltage across the processor below the Vmax for a given time. The low state protective current prevents voltage swings and keeps the processor and the controller 150 from frequently activating or deactivating the voltage protection mechanisms described herein. For example, for the voltage scenario 420, the processor exits the high voltage state at time 6, but the controller 150 activates the low state protective current such that the when the processor reenters a high voltage state at time 9, the voltage 423 across the processor remains below the Vmax 410.

In another example, at block 350 the controller determines the processor voltage level is below a high voltage state threshold, indicating the processor is not in a high voltage state and will remain in the low voltage state for a given time. In this case, method 300 proceeds to block 352 where the controller 150 deactivates the active current generators begins monitoring the processor at block 302.

In some examples, as discussed above the controller 150 identifies and stores predictive conditions in order to prevent high voltages states from causing voltages above a Vmax in the future. For example, as shown in FIG. 4, the voltage across the device in the voltage scenario 450 begins increasing at time 3, exceeds the Vmax at time 6, and is at a high level above Vmax at times 7 and 8. In some examples, as the processor proceeds through the scenario 150 a first time, the controller 150 identifies predictive conditions associated with the high voltage state. For example, at times 6 and 7 in block 310 of the method 300, the controller identifies the conditions of the processor at least the times 6 and 7, but also for times earlier (such as times 3-5) that led to the high voltage state at time 7. For example, the processor may execute a high power workload from times 1-3 and begins to exit execution of the workload at times 3-6 and completely ends the execution at time 7. The result drop in power across the device causes the voltage of the device to spike above the Vmax.

The controller 150 identifies the conditions, such as behavior conditions of the device from times and the physical conditions of the device that indicate the device is leaving the high power state and entering the high voltage state. At a later time and in block 360 the controller 150 uses the identified conditions to determine when the conditions indicate an oncoming high voltage state. For example, the processor in the scenario 460 is executing a same or similar workload as the processor in the voltage scenario 450. As the processor exits execution of the workload at times 3-7, the controller 150 uses the identified conditions to detect an oncoming high voltage condition. For example, at time 5 the controller 150 at block 360 detects the identified conditions and method 300 proceeds to block 362.

At block 362, the controller 150 determines a predictive current for the processor, where the predictive current provides a current that will keep the voltage across the device lower than the Vmax when the device enters a lower power—high voltage state. For example, the predictive current for the scenario 460 enacted at time 5 prevents the voltage across the processor from exceeding the Vmax at times 6-9.

In some examples, the method 300 then proceeds to blocks 316-322 using the predictive current instead of the protective current and at block 322, the controller activates the current generator to implement the predictive current prior to the device entering a high voltage state (e.g., at time 5 for the scenario 460).

Moreover, the steps of method 300 described allow for a continuous feedback and monitoring of the processor. In some examples, the controller 150 uses various thresholds and configurations to perform each of the steps above. For example, the conditions at block 304 and 306 which indicate that the processor in in a high voltage stay may be updated or reconfigured to allow for precision in identifying high voltage sates in the device.

Additionally, the selection of current generators and voltage level estimation for the processor may be updated and reconfigured based on the performance of the processor over time to allow for precise and granular adjustment of the voltage level across the processor and to keep the processor from exceeding a Vmax for long periods of time.

FIG. 5 illustrates a block diagram of a controller 150, according to one embodiment. The arrangement 500 is shown in the form of a general-purpose computing device. The components of controller 150 may include, but are not limited to, one or more processing units, computer processors, or processors 505, a memory 510, a storage system 520, and a bus 550 that couples various system components including the memory 510 and storage system 520 to processors 505 along with various input/output (I/O) components 540. In other embodiments, controller 150 is distributed and includes a plurality of discrete computing devices that are connected through wired or wireless networking.

Bus 550 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Arrangement 500 typically includes a variety of computer system readable media. Such media may be any available media that is accessible by controller 150, and it includes both volatile and non-volatile media, removable and non-removable media. Memory 510 can include computer system readable media in the form of volatile memory, such as random access memory (RAM) and/or cache memory. The controller 150 may further include other removable/non-removable, volatile/non-volatile computer system storage media. By way of example, storage system 520 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 550 by one or more data media interfaces. As will be further depicted and described below, memory 510 may include at least one program product having a set (e.g., at least one) of program modules that are configured to carry out the functions of embodiments of this disclosure.

The controller 150 may further include other removable/non-removable, volatile/non-volatile computer system storage media. In some examples, storage system 520 may be included as part of memory 510 and may typically provide a non-volatile memory for the networked computing devices, and may include one or more different storage elements such as Flash memory, a hard disk drive, a solid state drive, an optical storage device, and/or a magnetic storage device. For example, storage system 520 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 550 by one or more data media interfaces. Storage system 520 may include media for storing condition factors 521, prediction metadata 522, and selection data 523. The storage system 520 may be updated and accessed by program modules 515 described herein.

Memory 510 may include a plurality of program modules 515 for performing various functions described herein. The program modules 515 generally include program code that is executable by one or more of the processors 505. As shown, program modules 515 include condition module 511 and control module 512.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages discussed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method comprising:
monitoring a voltage state for a processor in a semiconductor device;
detecting, at a first time, the processor is in a high voltage state;
determining a protective current for the processor to lower the voltage state of the processor from the high voltage state;
activating at least one current generator to implement the protective current;
detecting, at a second time, the processor is in a second voltage state; and
adjusting an activation of the at least one current generator based on the second voltage state.

2. The method of claim 1, wherein monitoring the voltage state comprises:
monitoring at least one processor behavior condition on the processor;
correlating a first condition of the at least one processor behavior condition to a voltage state;
wherein determining the processor is in the high voltage state comprises:
detecting at least one factor in the first condition indicates the processor is in a high voltage state; and
determining the at least one factor is above a high voltage state threshold.

3. The method of claim 1, wherein monitoring the voltage state comprises:
monitoring at least one physical condition of the processor;
detecting, from the at least one physical condition, a processor voltage measurement; and
wherein determining the processor is in the high voltage state comprises:
determining the processor voltage measurement is above a high voltage state threshold.

4. The method of claim 1, wherein determining the protective current for the processor comprises:
determining a voltage level of the processor in the high voltage state;
determining the protective current to lower the voltage level below a maximum voltage level for the semiconductor device;
wherein activating at least one current generator comprises:
selecting a first number of current generators, wherein the first number of current generators draw a first current equal to the protective current; and
activating the first number of current generators.

5. The method of claim 1, wherein activating at least one current generator comprises:
determining an activation delay for the protective current; and
activating the at least one current generator according to the activation delay.

6. The method of claim 1, wherein determining the processor is in a second voltage state further comprises a feedback process comprising:
monitoring the voltage state for the processor in the high voltage state;
determining, from at least one of processor behavior conditions of the processor and physical conditions of the processor, a processor voltage level at second time is below a threshold for protective current deactivation; and
wherein adjusting the activation of the at least one current generator comprises:
when the processor voltage level at the second time is above a high voltage state threshold selecting a second number of current generators wherein the second number of current generators draw a second current; and when the processor voltage level at the second time is below the high voltage state threshold, deactivating the at least one current generator.

7. The method of claim 1, further comprising:
identifying, from at least one of processor behavior conditions of the processor and physical conditions of the processor, predictive conditions for the high voltage state;
detecting at a third time, using the predictive conditions, an oncoming high voltage state prior to detecting a second high voltage state;
determining a predictive current for the processor; and
activating the at least one current generator to implement the predictive current prior to the device entering the second high voltage state.

8. A system comprising one or more computer processors and a memory containing a program which when executed by the computer processors performs an operation comprising:
monitoring a voltage state for a processor in a semiconductor device;
detecting, at a first time, the processor is in a high voltage state;
determining a protective current for the processor to lower the voltage state of the processor from the high voltage state;
activating at least one current generator to implement the protective current;
detecting, at a second time, the processor is in a second voltage state; and
adjusting an activation of the at least one current generator based on the second voltage state.

9. The system of claim 8, wherein monitoring the voltage state comprises:
monitoring at least one processor behavior condition on the processor;
correlating a first condition of the at least one processor behavior condition to a voltage state;
wherein determining the processor is in the high voltage state comprises:
detecting at least one factor in the first condition indicates the processor is in a high voltage stage; and
determining that at least one factors is above a high voltage state threshold.

10. The system of claim 8, wherein monitoring the voltage state comprises:
monitoring at least one physical condition of the processor;
detecting, from at least one physical condition, a processor voltage measurement; and
wherein determining the processor is in the high voltage state comprises:
determining the processor voltage measurement is above a high voltage state threshold.

11. The system of claim 8, wherein determining the protective current for the processor comprises:
determining a voltage level of the processor in the high voltage state;
determining the protective current to lower the voltage level below a maximum voltage level for the semiconductor device;
wherein activating at least one current generator comprises:
selecting a first number of current generators, wherein the first number of current generators draw a first current equal to the protective current; and
activating the first number of current generators.

12. The system of claim 8, wherein activating at least one current generator comprises:
determining an activation delay for the protective current; and
activating the at least one current generators according to the activation delay.

13. The system of claim 8, wherein determining the processor is in a second voltage state further comprises a feedback process comprising:
monitoring the voltage state for the processor in the high voltage state;
determining, from at least one of processor behavior conditions of the processor and physical conditions of the processor, a processor voltage level at second time is below a threshold for protective current deactivation; and
wherein adjusting the activation of the at least one current generator comprises:
when the processor voltage level at the second time is above a high voltage state threshold selecting a second number of current generators wherein the second number of current generators draw a second current; and
when the processor voltage level at the second time is below the high voltage state threshold, deactivating at least one current generator.

14. The system of claim 8, further comprising:
identifying, from at least one of processor behavior conditions of the processor and physical conditions of the processor, predictive conditions for the high voltage state;
detecting at a third time, using the predictive conditions, an oncoming high voltage state prior to detecting a second high voltage state;
determining a predictive current for the processor; and
activating the at least one current generator to implement the predictive current prior to the device entering the second high voltage state.

15. A controller comprising:
condition circuitry configured to:
monitor a voltage state for a processor in a semiconductor device;
detect, at a first time, the processor is in a high voltage state;
detect, at a second time, the processor is in a second voltage state; and
control circuitry configured to:
determine a protective current for the processor to lower the voltage state of the processor from the high voltage state;
activate at least one current generator to implement the protective current; and
adjust an activation of the at least one current generator based on the second voltage state.

16. The controller of claim 15, wherein the condition circuitry is further configured to:
monitor at least one processor behavior condition on the processor;
correlate a first condition of the at least one processor behavior condition to a voltage state;
detect at least one factor in the first condition indicates the processor is in a high voltage stage; and
determine the at least one factors is above a high voltage state threshold.

17. The controller of claim 15, wherein the condition circuitry is further configured to:
monitor at least one physical condition of the processor;

detect, from the at least one physical condition, a processor voltage measurement; and
determine the processor voltage measurement is above a high voltage state threshold.

18. The controller of claim 15, wherein the control circuitry is configured to:
determine a voltage level of the processor in the high voltage state;
determine a protective current to lower the voltage level below a maximum voltage level for the semiconductor device;
select a first number of current generators, wherein the first number of current generators draw a first current equal to the protective current; and
activate the first number of current generators.

19. The controller of claim 15, wherein the control circuitry is further configured to:
determine an activation delay for the protective current; and
activate the at least one current generators according to the activation delay.

20. The controller of claim 15, wherein the condition circuitry is further configured to:
monitor the voltage state for the processor in the high voltage state;
determine, from at least one of processor behavior conditions of the processor and physical conditions of the processor, a processor voltage level at second time is below a threshold for protective current deactivation; and
wherein the control circuitry is further configured to:
when the processor voltage level at the second time is above a high voltage state threshold select a second number of current generators wherein the second number of current generators draw a second current; and
when the processor voltage level at the second time is below the high voltage state threshold, deactivate at least one current generator.

21. A computer-readable storage medium comprising computer program code that, when executed by operation of one or more computer processors, performs an operation comprising:
monitoring a voltage state for a processor in a semiconductor device;
detecting, at a first time, the processor is in a high voltage state;
determining a protective current for the processor to lower the voltage state of the processor from the high voltage state;
activating at least one current generator to implement the protective current;
detecting, at a second time, the processor is in a second voltage state; and
adjusting an activation of the at least one current generator based on the second voltage state.

22. The computer-readable storage medium of claim 21, wherein monitoring the voltage state comprises:
monitoring at least one processor behavior condition on the processor;
correlating a first condition of the at least one processor behavior condition to a voltage state;
wherein determining the processor is in the high voltage state comprises:
detecting at least one factor in the first condition indicates the processor is in a high voltage stage; and
determining that at least one factors is above a high voltage state threshold.

23. The computer-readable storage medium of claim 21, wherein monitoring the voltage state comprises:
monitoring at least one physical condition of the processor;
detecting, from at least one physical condition, a processor voltage measurement; and
wherein determining the processor is in the high voltage state comprises:
determining the processor voltage measurement is above a high voltage state threshold.

24. The computer-readable storage medium of claim 21, wherein determining the protective current for the processor comprises:
determining a voltage level of the processor in the high voltage state;
determining the protective current to lower the voltage level below a maximum voltage level for the semiconductor device;
wherein activating at least one current generator comprises:
selecting a first number of current generators, wherein the first number of current generators draw a first current equal to the protective current; and
activating the first number of current generators.

25. The computer-readable storage medium of claim 21, wherein determining the processor is in a second voltage state further comprises a feedback process comprising:
monitoring the voltage state for the processor in the high voltage state;
determining, from at least one of processor behavior conditions of the processor and physical conditions of the processor, a processor voltage level at second time is below a threshold for protective current deactivation; and
wherein adjusting the activation of the at least one current generator comprises:
when the processor voltage level at the second time is above a high voltage state threshold selecting a second number of current generators wherein the second number of current generators draw a second current; and
when the processor voltage level at the second time is below the high voltage state threshold, deactivating the at least one current generator.

* * * * *